United States Patent Office 3,489,653
Patented Jan. 13, 1970

3,489,653
PROCESS AND APPARATUS FOR PRODUCING CONCENTRATED NITRIC ACID
Max Strawn, Cincinnati, Ohio, and Lloyd E. Altamirano, West New York, N.J., assignors to The Chemical and Industrial Corp., Cincinnati, Ohio, a corporation of Ohio
Filed May 9, 1967, Ser. No. 637,160
Int. Cl. C01b 21/44
U.S. Cl. 203—13       7 Claims

ABSTRACT OF THE DISCLOSURE

A process for increasing the concentration of nitric acid produced in an absorption column by recycling a portion of the product acid and contacting it with the stream of process gases introduced into the column in order to dry the gases before entering the absorption section of the column.

BACKGROUND OF THE INVENTION

This invention relates to an improved method and apparatus for the production of concentrated nitric acid in an absorption column. More particularly the invention is directed to a novel method of operation and a novel construction which result in economical production of nitric acid of high concentration.

As is well known, when $N_2O_4$ is absorbed in water, nitric acid is produced by the following reaction:

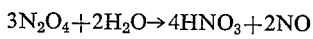

The NO produced in the above reaction then reacts with oxygen introduced into the absorption column along with the oxides of nitrogen to form $NO_2$ by the following reaction:

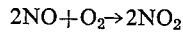

This additional $NO_2$ is absorbed, in its molecular form of $N_2O_4$, in water to produce additional nitric acid.

No particular difficulties are encountered when producing nitric acid up to about 57–60% concentration in conventional absorption columns wherein process gases containing oxides of nitrogen and oxygen are introduced into the bottom of the column, and water and/or dilute nitric acid are introduced into the top of the column counter-current to the process gases. However, the demand for nitric acid of considerably higher concentration has increased, and attempts to produce nitric acid in concentrations approaching the theoretical maximum concentration attainable in absorption columns have encountered difficulties and problems which have been previously solved only by expensive equipment. Since it is known that the absorption of $NO_2$ by water and the oxidation of NO proceed more efficiently at lower temperatures, the expedient of refrigerating the water introduced into the absorption column has been suggested. Similarly, the cooling of the process gases, containing oxides of nitrogen, moisture and air, has been suggested. Operation at superatmospheric pressure has also been found to be advantageous. However, these and numerous other procedures, although increasing the efficiency of the absorption column and decreasing the percentage of oxides of nitrogen in the tail gases withdrawn from the top of the column, add greatly to installation and operating costs, and a need still exists for an economical method and apparatus for producing nitric acid of greater than 60% concentration.

It has previously been recognized that excessive water vapor in the process gases entering the bottom of the absorption column should be avoided. U.S. Patent No. 1,872,638, issued Aug. 16, 1932, to I. Hechenbleikner, suggests that the gases be cooled below their dew point with such normal cooling water as may be available in each locality. However, since the temperature of such water ordinarily would vary between about 50° and 90° F., it is apparent that substantial amounts of moisture would remain in the process gases introduced into the absorption column because such gases would still be saturated with water vapor at the ambient temperature of the cooling water. It has apparently been tacitly recognized that the provision of refrigeration equipment to condense substantially all the moisture from the gases would be prohibitive in cost since we are not aware of any suggestions for this purpose in the prior art. Moisture so introduced by the process gases can reduce the concentration of product acid by about 0.5% to 2.5%.

SUMMARY OF THE INVENTION

It is a principal object of the instant invention to prevent the dilution of the concentrated nitric acid product by the moisture contained in the stream of process gases introduced into the bottom of the absorption column by drying the stream of process gases before it enters the absorption section of the column.

It is a further object of the invention to utilize product nitric acid to dry the stream of process gases before it enters the absorption section of the column.

BRIEF DESCRIPTION OF THE DRAWING

These and other objects of the invention which will become apparent to those skilled in the art from the following description of the invention, are accomplished by that method and by that construction and arrangement of parts of which exemplary embodiments are described herein. Reference is made to the accompanying drawing which is a flow sheet illustrating a preferred arrangement and construction for drying the stream of process gases before it enters the absorption section of an absorption column.

DESCRIPTION OF THE PREFERRED EMBODIMENTS

Figure 1:
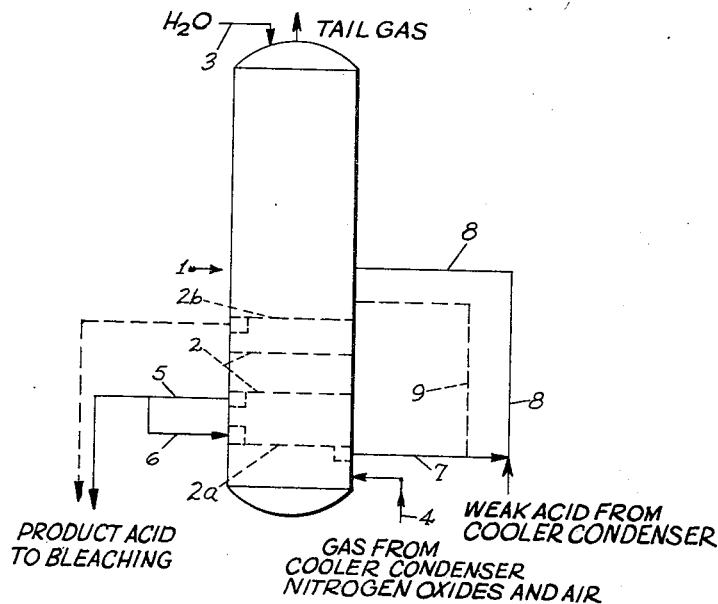

As is well known to those skilled in the art, the process gases, containing oxides of nitrogen and air are ordinarily produced by oxidation of ammonia, and water is a product of this oxidation reaction. Although the process gases from the ammonia oxidation are passed through a cooler-condenser, before passage to the inlet of the nitric acid absorption column, these gases are cooled only to a temperature range generally of 60° to 120° F., and are substantially completely saturated with water vapor when they leave the cooler-condenser. As is also well known the gases react with the water in the cooler-condenser to form dilute nitric acid, and in fact a substantial portion of the reaction is completed before the process gases reach the absorption column. This weak acid is condensed into liquid form in the cooler-condenser and pumped in conventional manner to an intermediate or upper portion of the absorption column where it is contacted by and absorbs additional $NO_2$.

Referring to the drawing, an absorption column, indicated generally at 1, is provided with a plurality of spaced-apart, apertured trays, indicated generally at 2. Although not shown in the drawing, it will be understood that the trays are provided throughout the length of the column. These trays are conventional bubble trays which are adapted to hold liquid temporarily thereon and to provide intimate contact between the water and/or dilute nitric acid and the gases during the countercurrent flow thereof. The water inlet is indicated at 3, and the process gas inlet is indicated at 4. An outlet for the nitric acid product beneath one of the trays in the lower portion of the absorption section of the column is indicated at 5. The product acid reaches its maximum concentration at this region of the column.

In the preferred embodiment of the invention diagrammatically illustrated in the drawing, the product acid is withdrawn from the second tray from the bottom through outlet 5 and the major portion thereof is conducted to the bleaching stage. A minor fraction of the product acid is recycled through the line 6 back to the next lower, or first, tray indicated at 2a in FIG. 1. The equilibria, at the temperatures at which absorption columns are ordinarily operated (60°–120° F.), are such that product nitric acid having a concentration between about 60% and 70% by weight will remove substantially all the moisture from a saturated gas stream in a single contact stage. Therefore, by recycling a portion of the product acid to a tray below the absorption section of the column the stream of process gas entering the column through the line 4 is substantially completely dried at the first tray by contact with the product acid before the gases enter the absorption section.

Since the acid recycled to the first tray is diluted by the moisture removed from the stream of process gases, this diluted acid is discharged from the underside of the first tray through line 7. As indicated in the drawing, this diluted acid can be mixed with weak acid from the cooler-condenser, and the same equipment required to pump the weak acid from the cooler-condenser will also suffice to return the combined streams through line 8 to an intermediate or upper portion of the absorption column. Alternatively the diluted acid from tray 2a can be returned to the absorption column through a separate line indicated at 9 in the drawing.

It will of course be understood that the embodiment illustrated in the drawing is exemplary only and it is within the scope of the invention to withdraw the product acid from a third or higher tray in the column and to recycle a portion of the product acid to the next tray beneath the tray from which the product is withdrawn. For example, if the product acid were withdrawn from the third tray, the recycled fraction would be returned to the second tray, and the process gases entering the bottom of the column through line 4 could then be contacted by product acid in the second and first trays if desired, although it has been found that substantially complete removal of the moisture from the process gases occurs in a single contact stage. In every arrangement the absorption section is above the tray at which product acid is withdrawn.

The size of nitric acid absorption columns is determined by requirements for gas residence in the column and the number of contact stages therein. The liquid loading of the column ordinarily is not a parameter to be considered in determining the size of the column since the liquid loading is generally well below the maximum which can be handled. Therefore, the liquid rate can be increased substantially without requiring a corresponding increase in the size of the column. The recycling of nitric acid to dry the process gases from the cooler-condenser, and return of the diluted acid used for drying to the intermediate or upper section of the column thus does not increase the liquid loading to an extent which would require any increase in the size of the column or in the number of contact stages. Moreover, since the recycled acid does not react with the oxides of nitrogen in the incoming stream of process gas, it imposes no additional heat load on the column.

The amount of recycled nitric acid used for drying, assuming removal of substantially all of the water vapor from the gas stream in one contact stage, can readily be determined by a material balance and by equilibrium considerations.

The practice of the present invention makes it possible to increase the concentration of the nitric acid product from about 0.5% to 2.5%, if the process gas stream is dried, when producing acid within a range of 60% to 70% concentration by weight. When producing acid of less than 65% concentration, the molar ratio of nitrogen oxides in the process gases to product acid in the column is conventionally maintained at about 1:1. Under these conditions the amount of moisture present in the incoming gases would reduce the concentration of product acid in the first tray by about 0.5% only. However, when producing acid of greater than 65% concentration, the molar ratio of nitrogen oxides to product acid is increased to a higher value, e.g., 5:1, and each additional mole of nitrogen oxides also contains enough water vapor to reduce the concentration of product acid by another 0.5%. For example, a 5:1 ratio results in a 2.5% decrease in concentration of product acid, and the increase in the ratio of nitrogen oxides is thus self-defeating.

It will be recognized that an increase in the molar ratio of nitrogen oxides to product acid makes it theoretically possible to produce acid of higher concentration than is obtained with a 1:1 ratio in a column of the same size and having the same number of trays. Application of the teachings of the present invention makes it possible for the first time to realize the theoretical maximum increase in concentration attainable by operation at ratios of greater than 1:1, without a change in the design or size of the column. From this advantage also ensues an ancillary advantage of enabling production economically of product acid of two different concentrations. For example, if a column is designed to produce 62% concentration acid at a 1:1 ratio, an increase in the ratio to some higher value, e.g. 5:1, would result in production of acid of 62% concentration at an intermediate tray higher in the column than the second from bottom tray from which 62% concentration acid ordinarily would be withdrawn when operating at a 1:1 ratio and the product acid withdrawn from this second from bottom tray would have a concentration of greater than 65%. Thus, a major fraction of the product acid having a concentration of 62% may be withdrawn from an intermediate tray indicated at 2b in FIG. 1, while a minor fraction of greater than 65% concentration would be withdrawn from outlet 5 in FIG. 1. A portion of this higher concentration acid would of course be recycled through line 6.

It should also be recognized that the increase in concentration obtained in the practice of the invention will be obtained over and above any other prior art procedures for increasing the concentration of the product acid, and the invention can thus be used to advantage in addition to any such procedures, whether operating at atmospheric or superatmospheric pressures.

It is to be understood that while the invention has been shown as embodied in certain modes of operations and certain arrangements and structures, such showing is exemplary only and the modes of operations and arrangements and structures are not to be considered a limitation on the invention except insofar as they are specifically set forth in the appended claims. For example, it is within the scope of the invention to provide a desiccating chamber between the cooler-condenser and the inlet 4 at the bottom of column 1 in place of the product nitric acid recycling system of FIGURE 1. Any of the commonly used desiccant or dehydrating materials, such as concentrated sulfuric acid, silica gel and the like, may be provided in the chamber. However, it will be recognized that this results in higher installation and operating costs, and that the use of a desiccant material introduces the possibility of contaminating the stream of process gases.

The embodiments of the invention in which an exclusive property or privilege is claimed are defined as follows:

1. In the process of producing nitric acid of greater than 60% concentration by the absorption of oxides of nitrogen in water, which includes the steps of subjecting a continuous and confined flow of water to a countercurrent stream of process gases containing oxides of nitrogen, water vapor and air, continuously withdrawing the entire nitric acid product stream formed by reaction of said oxides of nitrogen in said process gases with said water at a point intermediate said flow, and causing a portion of said withdrawn acid product stream continuously to contact said stream of process gases prior to contact of said gases with said flow of water, the improvement which comprises withdrawing said portion of acid product, after causing said portion to contact said process gases, as a stream separate from said entire acid product stream, and separately returning said separate stream of said portion to a point preceding said intermediate point in said confined flow, whereby to reconcentrate said portion of acid product before it is again withdrawn in said entire acid product stream.

2. In the process of producing nitric acid of greater than 60% concentration by the absorption of oxides of nitrogen in water, which includes the steps of subjecting a continuous and refined flow of water to a countercurrent stream of process gases containing oxides of nitrogen, water vapor and air, withdrawing the nitric acid product stream formed by reaction of said oxides of nitrogen in the process gases with water at a point intermediate the flow, recycling a portion of said withdrawn product stream, and causing said recycled portion to contact said stream of process gases prior to contact of said gases with said flow of water, the improvement which comprises withdrawing said recycled portion of product acid, after causing said portion to contact the process gases thereby substantially removing the water vapor from said gases, as a stream separate from said withdrawn acid product stream, and separately returning said separate stream of recycled acid product to a point preceding said intermediate point in said confined flow of water, whereby to reconcentrate said recycled acid product portion and avoid dilution of said nitric acid product stream.

3. The process of claim 2, including the steps of increasing the molar ratio of oxides of nitrogen to nitric acid product to a value greater than 1:1, and withdrawing a fraction of nitric acid product as a second stream of nitric acid product of lower concentration than said first mentioned withdrawn nitric acid product.

4. In apparatus for producing nitric acid of greater than 60% concentration by the absorption of oxides of nitrogen, comprising an absorption column, a plurality of spaced-apart, apertured trays which temporarily retain liquid thereon positioned within said column, a water inlet at the top of said column, a process gas inlet at the bottom of said column, and an outlet for nitric acid product in the lower portion of an absorption section of said column; the improvement which comprises means for drying said process gas prior to contact thereof with the nitric acid product in said absorption section of said column, said means for drying process gas including a recycle line from said outlet for nitric acid product, a connection between said recycle line and said column at the next tray below said outlet, and a discharge from said next tray for withdrawal of acid contacted by said process gas.

5. The apparatus of claim 4, including means for reintroducing said acid withdrawn from said next tray into the absorption section of said column.

6. The apparatus of claim 5, wherein said nitric acid outlet is at the second tray from the bottom of said column, and wherein said recycle connection is at the first tray from the bottom of said column.

7. The apparatus of claim 5, wherein said nitric acid outlet is at the third tray from the bottom of said column, and wherein said recycle connection is at the second tray from the bottom of said column.

References Cited

UNITED STATES PATENTS 2,132,663  10/1938  Voogd _____ 23—160

FOREIGN PATENTS 120,378  9/1919  Great Britain.
897,955  4/1945  France.
1,087,852  3/1955  France.

NORMAN YUDKOFF, Primary Examiner

J. SOFER, Assistant Examiner

U.S. Cl. X.R.

23—157, 307; 159—47; 202—158